United States Patent

Watanabe et al.

Patent Number: 5,414,963
Date of Patent: May 16, 1995

[54] BELT GRINDING MACHINE

[75] Inventors: Koji Watanabe; Makoto Inoue, both of Kobe, Japan

[73] Assignee: Bando Kagaku Kabushiki Kaisha, Kobe, Japan

[21] Appl. No.: 73,581

[22] Filed: Jun. 7, 1993

[30] Foreign Application Priority Data

Jun. 18, 1992 [JP] Japan ................................ 4-185876
Dec. 24, 1992 [JP] Japan ................................ 4-358487

[51] Int. Cl.$^6$ ............................................ B24B 19/11
[52] U.S. Cl. ........................................ 451/72; 451/21; 451/450
[58] Field of Search .................. 51/5 D, 165.87, 327, 51/267, 356, 325, 105 R

[56] References Cited

U.S. PATENT DOCUMENTS

| | | | |
|---|---|---|---|
| 3,513,596 | 5/1970 | Beauchet et al. | 51/165.87 |
| 3,869,831 | 3/1975 | Gibb | 51/327 |
| 4,322,916 | 4/1982 | Richmond | 51/327 |
| 4,329,192 | 5/1982 | White, Jr. et al. | 51/103 R |
| 5,214,881 | 6/1993 | Borchardt | 51/267 |

FOREIGN PATENT DOCUMENTS

| | | | |
|---|---|---|---|
| 0701220 | 1/1941 | Germany | 51/267 |
| 0164779 | 7/1986 | Japan | 51/267 |

*Primary Examiner*—Robert A. Rose
*Attorney, Agent, or Firm*—Marshall, O'Toole, Gerstein, Murray & Borun

[57] ABSTRACT

This disclosure relates to a belt grinding machine that can be used to grind rubber belts containing special fiber(s) without causing troubles due to wear or clogging of the grinding wheel. A belt driving mechanism including rolls and for carrying a belt over them, a grinding wheel including a rotary driving means and a reciprocating means, and a rotary dresser for dressing the surface of the grinding wheel are arranged in this order in a direction perpendicular to the axes of the rolls, grinding wheel and rotary dresser all set in parallel to each other.

11 Claims, 6 Drawing Sheets

BELT GRINDING MACHINE

FIELD AND BACKGROUND OF THE INVENTION

The present invention relates to a belt grinding machine which is used to produce belts made of fiber-reinforced rubber and having longitudinally extending ribs and grooves such as V-ribbed belts.

A V-ribbed belt is a type of power transmission belt which has a plurality of V-shaped ribs (separated by grooves) arranged in the longitudinal direction. Thus it looks like a plurality of side-by-side V-belts joined in parallel with each other. Because of its configuration, a V-ribbed belt has the flexibility of a flat belt and the high transmission efficiency of a V-belt.

Such an unevenness (ribs and grooves) of a belt is normally formed by a grinding wheel or a cutter. First a flat or smooth belt is formed, and then the grooves are ground (or cut away).

Up to the present, grinding with a diamond wheel or with a rotary grinding wheel clad with diamond abrasive grains has been considered to be optimal for producing the above-mentioned grooves in belts containing cotton or nylon fibers in the rubber layer. The grinding wheel itself is expensive, but grinding with a diamond wheel is most desirable and efficient when the speed of processing, the cost per one piece of belt, etc. are considered.

The situation was found to be quite different for rubber belts containing fibers of special aramid such as Kevlar and Cornex. When rubber belts containing such a fiber having high strength and a high modulus of elasticity is ground with a diamond wheel, the wheel becomes worn and clogged in a short time because of the fiber. Hence the speed and precision of grinding will deteriorate as well. Moreover, the wear and clogging of the wheel cannot be restored in this case. As a result, the service life of the diamond wheel is reduced to about one hundredth of the life of a wheel used for grinding rubber belts containing nylon fiber. The production cost of the belts, in turn, will rise extremely.

SUMMARY OF THE INVENTION

The present invention provides a belt grinding machine which can be used to grind rubber belts containing aramid fiber or the like without causing any of the above-mentioned problems and is advantageous in terms of the efficiency, precision and cost of processing.

The belt grinding machine according to the present invention comprises a) a double or multiple shaft belt driving mechanism including rolls for holding a belt over them, an abrasive wheel for grinding including a rotary driving means, and a dresser for dressing the surface of the abrasive wheel, and b) a reciprocating means which is capable of producing a relative feed between the above-mentioned belt holding rolls and the grinding wheel and between the grinding wheel and the dresser so as to make a circumferential contact between the respective pairs.

The machine may further be provided with means for setting a reference position (position at which feeding for grinding is started) for the relative feed between a belt over the above-mentioned belt holding roll and the grinding wheel according to the relative feed between the grinding wheel and the dresser made by the above-mentioned reciprocating means.

It is also desirable to provide a metallic driven roll (roll which freely turns with the belt) as the above-mentioned grinding block roll (the belt holding roll) which is adjacent the grinding wheel, and to provide, as one of the other rolls of the belt driving mechanism, a driving roll (roll connected with a driving source such as a motor) of which the circumferential surface is formed of rubber or urethane. Furthermore, all the rolls of the belt driving mechanism may be set in parallel to each other, and a guide roll having flanges on both sides (at both ends in the axial direction) for preventing meandering of the belt may be provided near the above-mentioned grinding block roll which is adjacent the grinding wheel and in parallel to the above-mentioned grinding wheel, in such a way that the guide roll may be made to contact the belt or be retracted away from the belt.

There may also be provided a liquid jetting means which cools and washes the grinding wheel after grinding (thus it is located at the position of the grinding wheel after grinding). Moreover, one or more rolls of the belt driving mechanism, which contacts the belt, may be internally cooled with water, and an air spraying means may be provided for cooling the grinding wheel and preventing clogging during grinding (thus it is located at the position of the grinding wheel during grinding).

In the belt grinding machine according to the present invention, a belt to be processed is placed over the rolls of the belt driving mechanism, and, for example, the belt is ground by pressing the circumference of the grinding wheel against the belt surface. While the grinding wheel is being turned by a rotary driving means, the grinding wheel is pressed by the reciprocating means against the belt over the rolls. On the other hand, the belt is turned by the rolls so as to form the ribs and grooves in the circumferential direction of the belt (in its longitudinal direction). The size of the belt to be ground is not limited since the belt driving mechanism is of a double shaft system or of a multiple shaft system (the distance between the shafts can be adjusted).

When used, the grinding wheel is worn out or clogged on the surface. The surface may be dressed in the following manner before the speed and precision of grinding deteriorate beyond certain limits. The grinding wheel is moved away from the belt which is over the belt holding rolls. The grinding wheel is pressed against the wheel dresser by the reciprocating means. Dressing of the grinding wheel by the dresser serves to remove the portion which has started to be clogged or to remove a worn and partially deformed portion so as to maintain the grinding speed and precision. So far the grinding wheel is described as being moved by the reciprocating means. The reciprocating means, however, may be used to shift the belt driving mechanism and the dresser instead of the grinding wheel, or to shift them together with the grinding wheel.

Accordingly, even when applied to grinding of rubber belts containing a special fiber, the present machine can continue to grind the belts with a high processing quality and a high efficiency. Since the surface of the grinding wheel is dressed by the wheel dresser, a wheel clad with special abrasive grains such as a diamond wheel cannot be used. An entirely homogeneous grinding wheel may be used over a long time virtually irrespective of its wear. Moreover, grinding wheels wherein abrasive grains such as fused alumina and silicon carbide are homogeneously present together with a bond and pores are generally very inexpensive relative to the diamond wheel. Overall, the production cost of the belts is reduced since an inexpensive grinding wheel can be used over many hours.

To constantly form a certain unevenness (the ribs and grooves) in the belt, it is required that the relative feed between the belt and the grinding wheel (depth of cut: the reference position is set, and from the reference position the belt and grinding wheel are moved closer to each other by a certain amount) is always appropriate in addition to that, as mentioned above, the surface profile of the grinding wheel is constant. When the grinding wheel is dressed as is the case of the present invention, the diameter of the grinding wheel becomes smaller step by step. Due care, therefore, must be paid to the setting of the reference point even though the amount of feed from the reference point is kept constant. The belt grinding machine automatically and appropriately sets the reference point.

The feed setting means of the machine determines the reference position of the feed between the belt over the rolls and the grinding wheel according to the relative feed between the grinding wheel and the dresser. The reduction in the diameter of the grinding wheel from its original diameter can be determined from the feed between the grinding wheel and the dresser during the dressing of the grinding wheel. Thus, when the belt and the grinding wheel are to be pressed against each other, the same depth of grinding as that of the grinding wheel prior to the dressing can be made by setting the reference point according to the reduction in the diameter and making the fixed feed. The machine, therefore, does not require the operator to perform a troublesome task such as setting the reference position for the grinding wheel feed by checking the distance between the belt and the grinding wheel and the condition of the contact between them.

In addition, the belt can be ground with a high precision because the roll which is adjacent the grinding wheel (the roll of the grinding block) is made of metal. The reason is that a metallic roll itself can be formed with a higher precision in its configuration and dimensions than rolls made of non-metallic materials such as resin, ceramics and wood, and its higher precision can be easily maintained. When the belts over the rolls are subjected to a tension, a grinding resistance or a pressing force of the grinding wheel, the strain and deformation of the metallic roll are very small. Since the roll of the grinding block that serves as a kind of surface plate for processing has a high precision and a high rigidity, the machine is capable of processing the belt with a high precision (in particular, high precision for the thickness and the surface condition).

The metallic roll, however, has a low coefficient of friction against a rubber belt, and it is not suited to power transmission for belt rotation. In the machine, the roll of the grinding block is a driven roll. Another roll of the belt driving mechanism is made a driving roll in place of it, and the surface of the driving roll is formed of rubber or urethane having a greater coefficient of friction. Since the coefficient of friction over the circumferential surface of the driving roll is large, the rotation of the belt for grinding is effected smoothly, and a misfeed (slippage) of the belt hardly occurs even when a grinding resistance or the like is present.

The machine further prevents meandering (slip in the direction of the width) of the belt and serves to improve the processing precision of the belt. In this machine, belt meandering is prevented by the action of the guide roll having flanges on both sides (at both ends of the roll). This method does not generate any mechanical unbalance in the belt over the roll of the grinding block in its width direction. Hence the processed belt is free of irregularity in the dimensions in the width direction due to strain, and is free of any deviation in the linearity of the ground ribs and grooves.

A method is frequently used to prevent belt meandering, wherein one of the rolls is slightly tilted to shift the belt to one end in the width direction, and the roll of the grinding block is provided with a flange at the end to which the belt tends to shift. When this method is used, the dimensions after processing tend to become irregular in the direction of the belt width. Thus the method is not desirable from the viewpoint of precision. Since the belt is rotated while the belt is constantly pressed against the flange, the belt meandering is reliably prevented, but since one of the rolls is tilted, the tension working on the belt varies along the width direction. Moreover, since only one side of the belt contacts the flange over the roll of the grinding block, only that side is deformed, and the clearance (deformability) during grinding at one side differs from that at the other side. Such deformation and different clearance result in a lower processing precision.

The machine is free of any of the above-mentioned disadvantages since all the rolls including the guide roll are parallel to each other and the roll of the grinding block is not provided with any flanges. Moreover, the guide roll does not constantly contact the belt, and can be shifted to a retracted position. Thus it is easy to place the belt over the belt driving mechanism.

The grinding wheel after grinding (or after dressing) can be cooled and washed as the occasion may demand. Thus the machine is advantageous in terms of the service life of the grinding wheel and the grinding efficiency.

In the machine, clogging of the grinding wheel and seizure of rubber (of the belt) due to heat generation can be prevented by the internally water-cooled rolls and the air spraying means. As a result, the precision and efficiency of processing are improved. The arrangement does not cause a problem of loss of power for turning the grinding wheel since any liquid such as cooling water is not sprayed over the grinding wheel during grinding.

BRIEF DESCRIPTION OF THE DRAWINGS

The invention may be better understood from the following detailed description taken in conjunction with the accompanying drawings, wherein.

DETAILED DESCRIPTION OF THE DRAWINGS

Figure 1A:
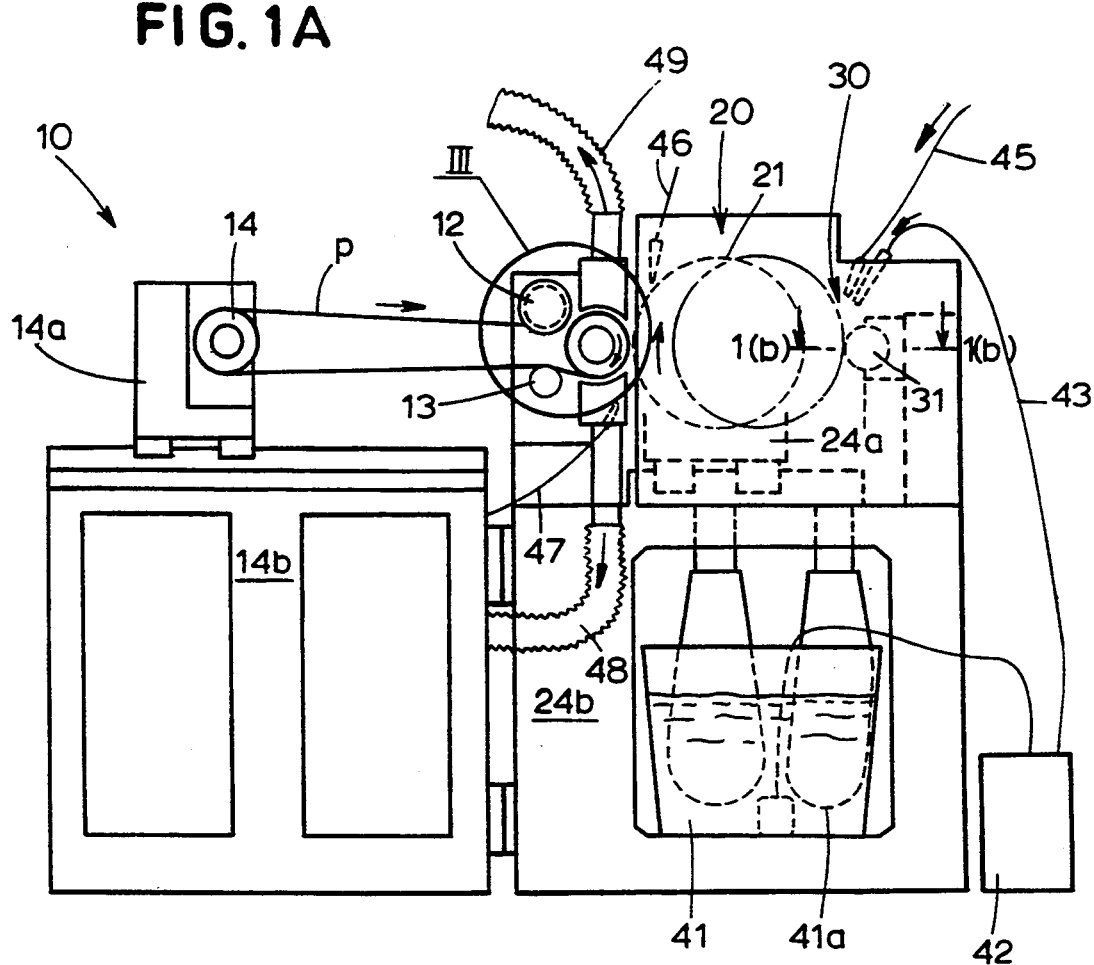
FIG. 1(a) is an elevational view of an embodiment of a belt grinding machine according to the present invention.
Figure 1B:
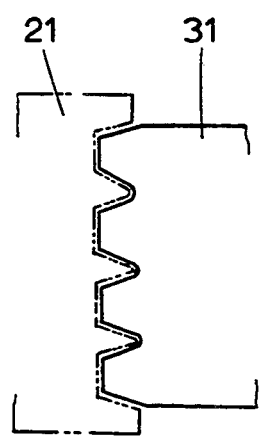
FIG. 1(b) is a sectional view taken along the line 1(b)—1(b) of FIG. 1(a).

The following description is with respect to the grinding of a V-ribbed belt which is made of rubber containing Cornex fiber and has four V-shaped ribs separated by grooves [see FIG. 1(b)].

The belt grinding machine of the embodiment shown in FIG. 1(a) comprises, basically, a belt driving mechanism 10, a grinding wheel 20 and a rotary dresser 30. A belt p to be processed (a flat belt prior to grinding) is rotated by the driving mechanism 10, and the grinding wheel 20, which is rotatively driven, is pressed against the surface of the belt p to effect grinding of the belt p. The grinding wheel 20 is periodically treated by the dresser 30 to dress it so as to prevent clogging and wear, and in turn, to maintain the grinding performance of the grinding wheel 20. In the following, the configuration and actions of each section of the machine discussed above, is described.

In the driving mechanism 10, two rolls 11 and 14 are provided and the belt p is placed over them, comprising a main roll 11 which is a driven roll that rotates freely, and a tension roll 14 which also serves as the drive roll. Between them are provided a guide roll 12 and a cooling roll 13. The main roll 11 is made of metal (such as carbon steel) since it allows machining at high precision and is hard to deform. The driving and tensioning roll 14 is formed of urethane which has a high coefficient of friction against the belt p so that a sufficient driving force can be transmitted to the belt p.

Figure 2:
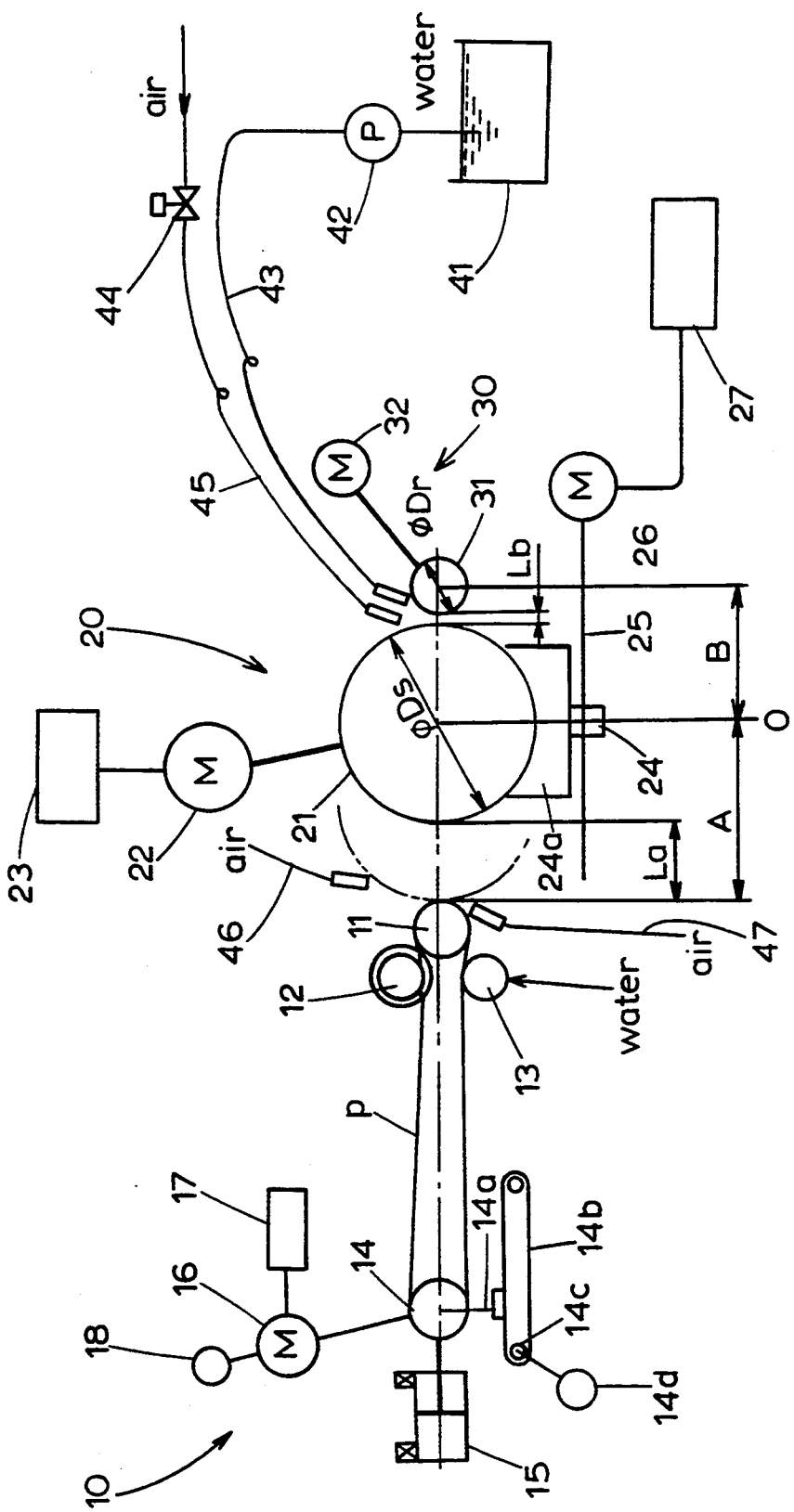
FIG. 2 is a diagram schematically showing the functioning of the belt grinding machine of FIG. 1(a)

The driving and tensioning roll 14 is mounted on a movable block 14a movably mounted on a base 14b, and the block 14a is pushed or pulled by a hydraulic cylinder 15 as shown in FIG. 2. To slacken or install/remove the belt p, the cylinder 15 is extended. To tension the belt p, the cylinder 15 is retracted. The position of the block 14a indicates the distance between two rolls 11 and 14 and provides a basis for determining the length of the belt p. The position of the block 14a is detected by means of a synchrobelt 14b and a rotary encoder 14d as shown in FIG. 2. The synchrobelt 14b rotates as the block 14a shifts. The angle of rotation of a pulley 14c resulting from the rotation of the synchrobelt 14b is detected by the encoder 14d, and the position of the block 14a is computed from the detected result. The roll 14 is turned by a motor 16, and the motor 16 is provided with a rotary encoder 18 for detecting the rotation (and in turn for detecting the travel of the belt p). The motor 16 is connected to an inverter unit 17 so that the speed of rotation of the motor 16 can be controlled. The inverter unit 17 is used because it is more inexpensive than using a DC motor for the motor 16. The cooling roll 13 is arranged to pass cooling water through its inside so as to cool the belt p undergoing grinding. Since the belt p needs the above-mentioned roughness on its inner face, it is placed over the driving mechanism inside out. It is needless to say that the driving mechanism 10 may be modified in various ways; for instance, the main roll 11 may be connected to a driving source rather than using the roll 14 as the driving roll, or encoders may be directly (not via the motor 16) installed on the roll 14 or on the roll 13.

Figure 3A:
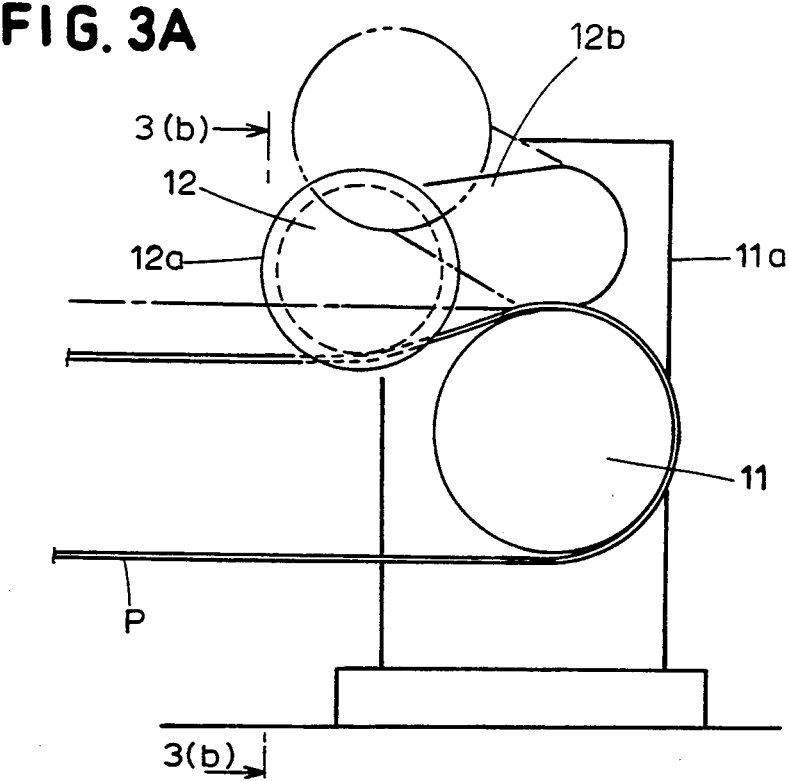
FIG. 3(a) is a front view showing the main roll and the guide roll in the grinding machine of FIG. 1(a)
Figure 3B:
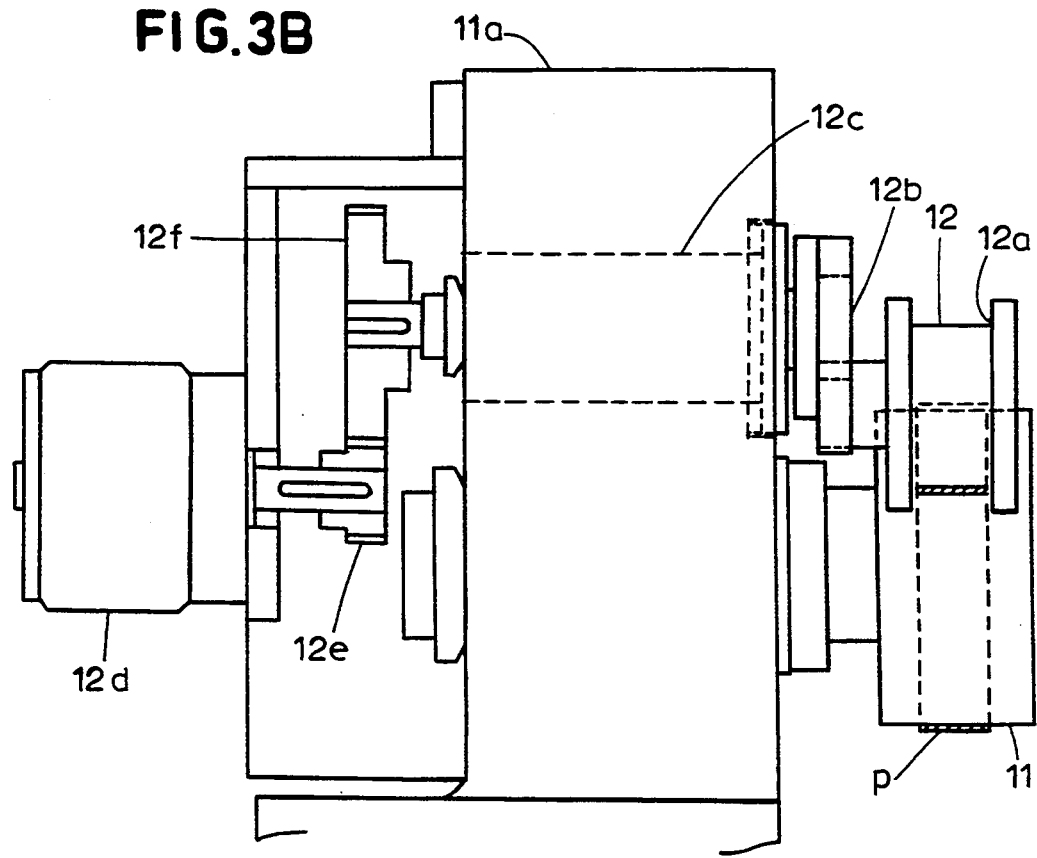
FIG. 3 (b) is a sectional view along the line 3(b)—3(b) of FIG. 3(a)

To prevent the belt p from meandering in the direction of its width during grinding or shifting, the guide roll 12 is provided near the main roll 11 in parallel with the main roll 11 and the other rolls 13 and 14. The guide roll 12 is provided with flanges 12a [FIGS. 3(a) and 3(b)] on both sides (two positions corresponding to both sides of the belt p) as shown in FIG. 3(b). When the belt p is placed between the flanges 12a, the belt p is restrained by the flanges and will not shift in the width direction. This roll 12 is a driven roll that can rotate freely, and is provided at the top end of a swing arm 12b as shown in FIG. 3(a). The position of the roll 12 can be between the upper position (shown in dash-dot-dot lines) and the lower position (shown in solid lines) by swinging the arm 12b. The arm 12b is swung by an arrangement, as shown in FIG. 3(b), wherein a rotary actuator (air motor) 12d is mounted on the rear of a block 11a to which the main roll 11 and the rotary actuator 12d are connected, via gears 12e and 12f, to a shaft 12c of the arm 12b. As shown in the diagram, when the guide roll 12 is placed against the belt p, the action of the flanges 12a properly prevents the belt p from meandering. When the actuator 12d is activated to lift the guide roll 12, it is easy to place a belt p over the main roll 11 and the driving and tensioning roll 14.

Regarding the grinding wheel 20, a grinding stone 21 having a high hardness is used, such as a wheel having as its main ingredient the abrasive grains of silicon carbide. Various components are connected to the grinding stone 21 as shown in FIG. 2. First, a motor 22 and an inverter unit 23 are connected as rotary driving means for the grinding stone 21. The grinding stone 21 is mounted on a movable block 24a placed on a stand 24b (FIG. 1). As for the reciprocating means for pressing the grinding stone 21 against the belt p being rotated in a fixed position (over the driving mechanism 10), the block 24a is provided with a ball nut 24, and a ball screw 25 coupled to a servo motor 26 is threaded through the nut 24. The grinding stone 21 is rotated at a variable speed by the above-mentioned rotary driving means, and can be reciprocated between the belt p over the roll 11 and the rotary dresser 30 by the reciprocating means. A control unit 27 is connected to the motor 26 as shown in FIG. 2. Dimensions of the grinding wheel 20 are inputted into the control unit 27. The unit 27 knows the position of the grinding wheel 20 from the rotation of the motor 26, and at the same time controls the travel of the grinding wheel 20 through the motor 26. As will be explained later, the control unit 27 provides, together with the reciprocating means including the motor 26, a means for automatically setting the reference position of the feed of the grinding wheel 20 against the belt p. The axis of the grinding stone 21 is parallel to that of the roll 11, and the direction of rotation of the grinding stone 21 is as shown by an arrow in FIG. 1(a); the direction of its circumferential speed is opposite to the direction of the movement of the belt p.

The rotary dresser 30 comprises a cylindrical dresser proper 31 installed in a position at which the above-mentioned grinding stone 21 can contact the dresser proper 31 when the grinding stone 21 is moved by the reciprocating means in the direction opposite to the side of the belt driving mechanism 10. A rotary drive motor 32 is connected to the dresser proper 31 as shown in FIG. 2. The axis of the dresser proper 31 is parallel to those of the grinding stone 21 and the roll 11, and the direction of rotation of the dresser proper 31, caused by the motor 32, is as indicated by an arrow in FIG. 1. FIG. 1(b) shows the state of contact between the grinding stone 21 and the dresser proper 31. The profile of the grinding stone 21 is a negative or reverse image of the roughness (ribs and grooves) of the belt p, whereas the profile of the dresser proper 31 is negative to the grinding stone 21, in other words, it is very close to the desired profile of the belt p.

Figure 5:
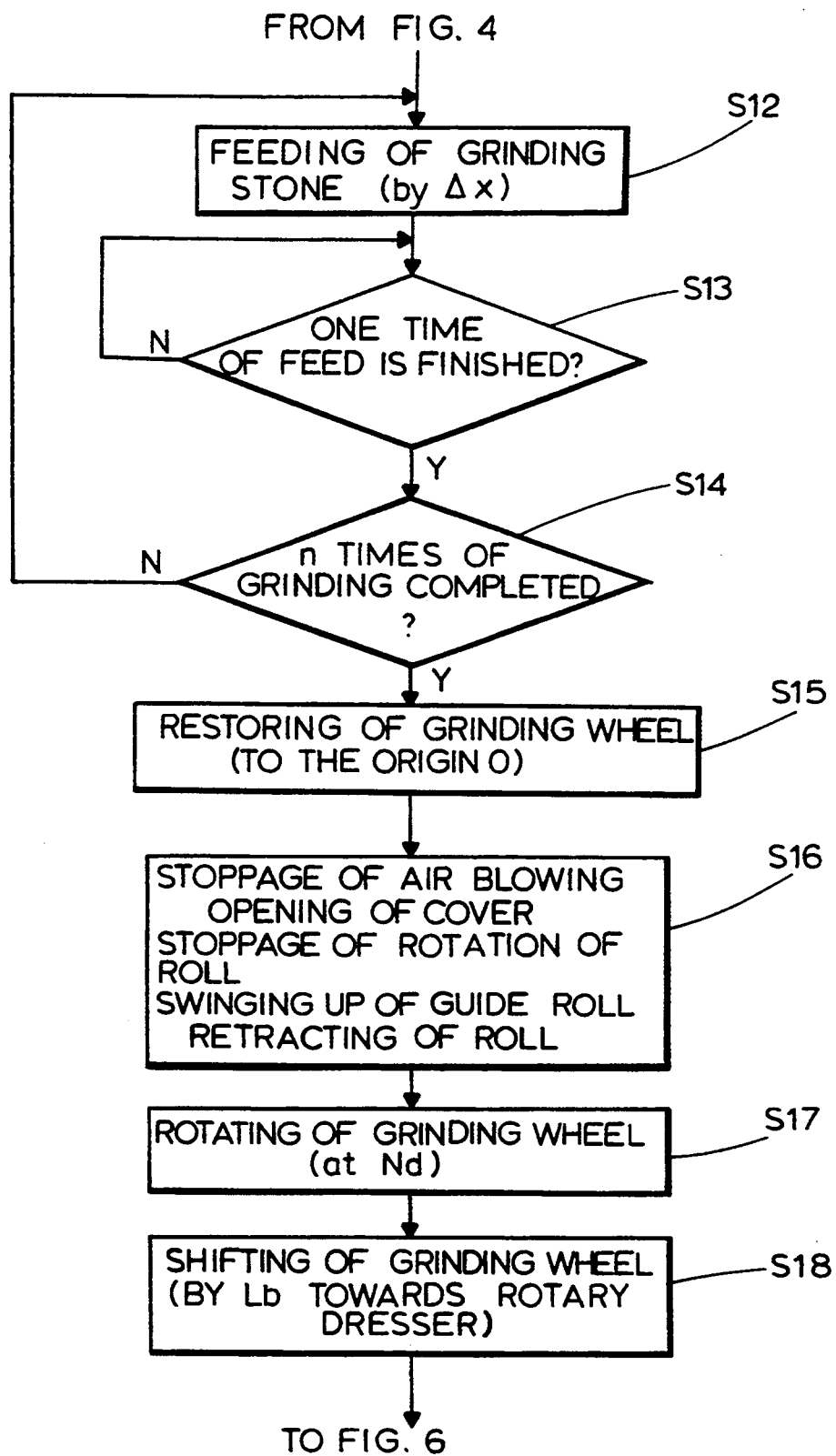
FIG. 5 is a continuation of the flow chart shown in FIG. 4 and is continued in FIG. 6.

In addition to the above-mentioned features, the machine is provided with the following components for supply of water and air and disposal of dust generated. First, high pressure water is jetted against the grinding stone 21 to cool the grinding stone 21 after grinding or to cool the grinding stone 21 and wash away debris of the grinding stone and abrasive grains during dressing. A tank 41, a pump 42, and water feed piping 43 are provided as means for this purpose as shown in FIG. 1(a) and FIG. 2. The tank 41 is located together with a filter 41a directly beneath the grinding wheel 20, etc. (inside the stand 24b), and the fed water is recovered and recirculated (the top end of the jet port of the feed water piping 43 is located close to the dresser 30 as shown in FIG. 1(a); the required shift of the grinding wheel 20 in the step S15 (FIG. 5), as will be explained later, can be reduced by placing the jet port closer to the left). After that, water is dried away by compressed air, and hence an air piping 45 including an open/close valve 44 (FIG. 2) is provided and is directed towards the grinding stone 21. To prevent water from wetting the belt p on the driving mechanism 10, a shielding plate (not illustrated) is preferably arranged to move in and out between the grinding stone 21 and the roll 11.

Moreover, to prevent heat buildup in the belt p during grinding, and to prevent drop in processing precision or productivity due to clogging of the grinding stone 21 or seizure of the belt p, compressed air is sprayed against the belt p and the grinding stone 21 during grinding, and, to this end, air pipings 46 and 47 are provided see FIGS. 1(a) and 2. The top jet end of the air piping 46 is directed towards the circumferential surface of the grinding stone 21 at the grinding position. The top jet port of the piping 47 is directed towards the grinding point or the lower portion of the contacting area between the belt p and the grinding stone 21. The former is mainly intended to lower the temperature of the grinding stone 21, and the latter is to cool the grinding stone 21 and the belt p and to prevent clogging. Water (cooling water) is not sprayed against the grinding stone 21, etc. The reason is to avoid the loss of rotary power (grinding power) due to water spraying. To cool the belt p, as mentioned above, an internally-water-cooled roll for cooling 13 is arranged to contact against the belt p. In relation to those mentioned above, dust collecting ducts 48 and 49 are provided as countermeasures against dust from grinding.

Figure 4:
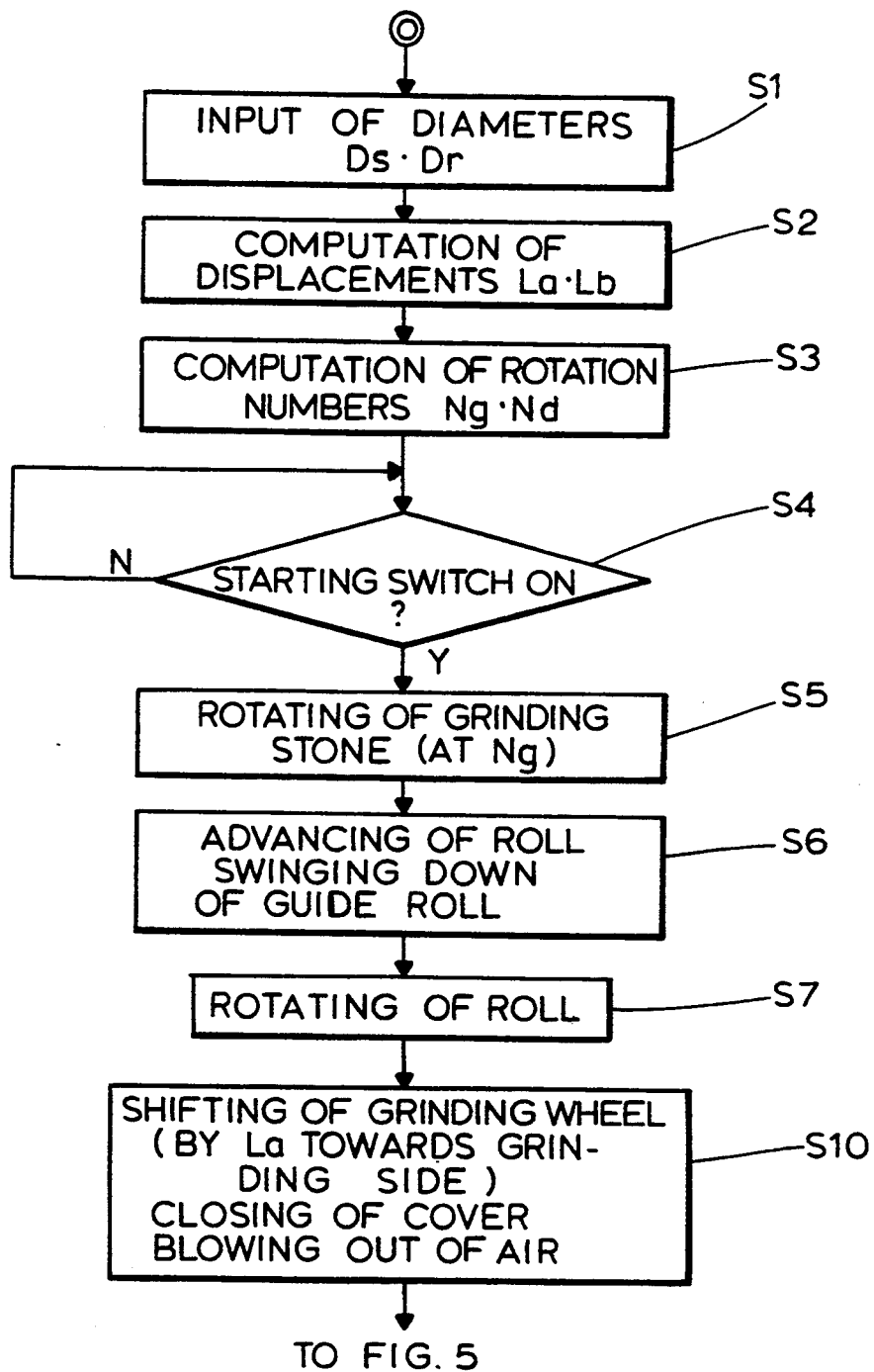
FIG. 4 is a part of a flow chart showing the grinding process and related processes of the belt grinding machine of FIG. 1(a) and FIG. 2, and is continued in FIG. 5.
Figure 6:
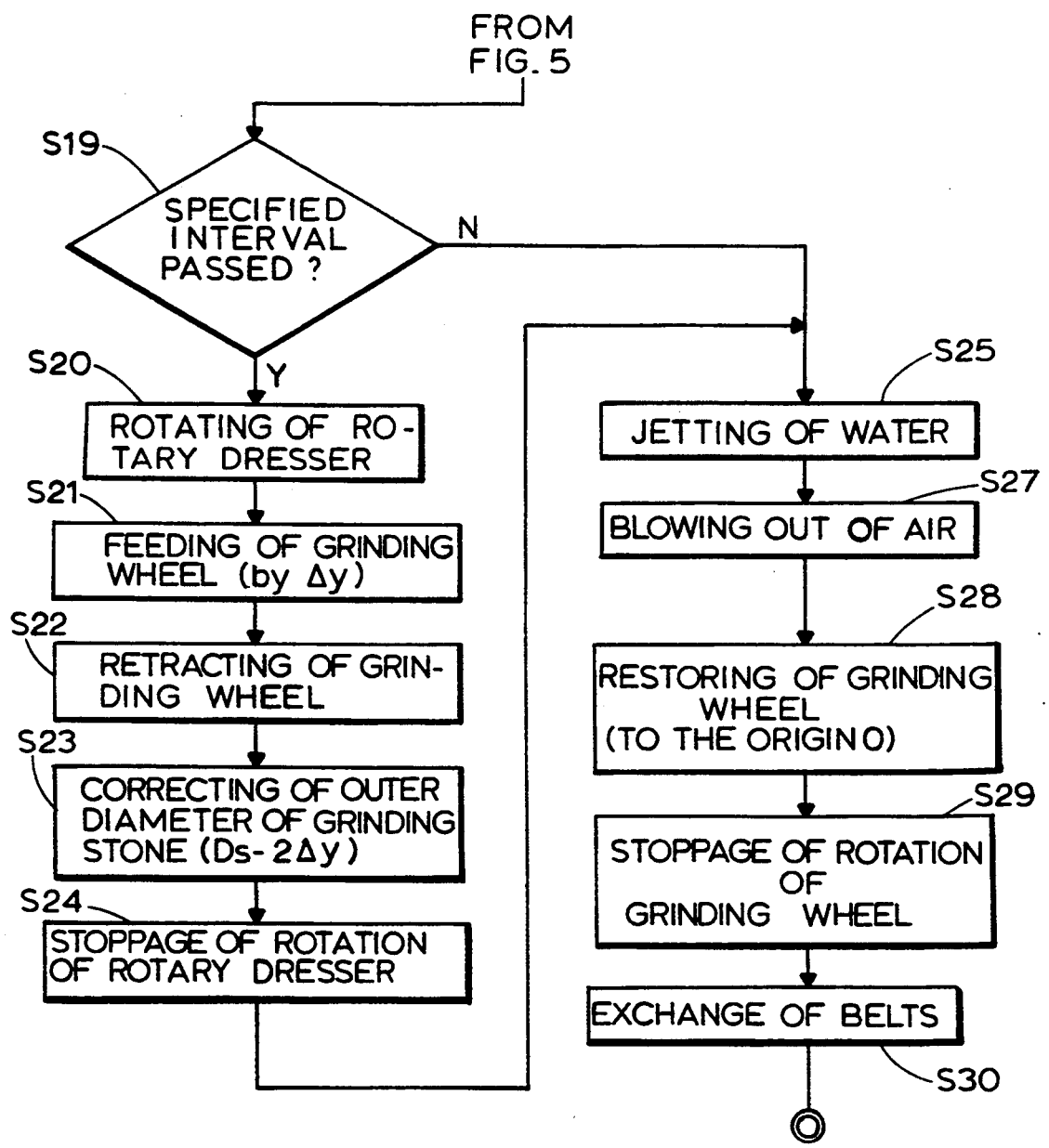
FIG. 6 is a continuation of the flow chart showing the grinding process and related processes of the belt grinding machine, which continues from the part shown in FIG. 5.

In the grinding machine with the configuration as described above, the procedure for placing a flat belt p, being an intermediate product over the belt driving mechanism 10 and forming the ribs and grooves in the surface of the belt p to produce a V-ribbed belt is as follows. In the following, the explanation is given according to the flow charts of FIG. 4 through FIG. 6 with reference to the schematic diagram of FIG. 2.

Steps S1 through S3: First, the diameter Ds of the grinding stone 21 and the diameter Dr of the dresser proper 31 are inputted in the control unit 27. The physical structure of the unit 27 may have a conventional construction and may be a small computer operating with a program following the flow chart of FIGS. 4 to 6. Then the displacements La and Lb (shown in FIG. 2) of the grinding wheel 20 are computed from the diameters and stored. Input of the diameters Ds and Dr are directly made by the operator through the control unit 27 according to measured values or standard values when the grinding machine is newly started. In other occasions, a value determined by the step S23, which will be explained later, is automatically inputted as Ds. La and Lb for Ds and Dr are calculated from distances A and B by $$La = A - Ds/2$$

and $$Lb = B - (Ds + Dr)/2$$

where A is the distance from the origin O to the surface of the belt p over the roll 11 and B is the distance from the origin O to the rotary dresser 30 (both values are inputted in advance) as shown in FIG. 2. Regarding the grinding stone 21, the number of rotations during grinding, Ng, and the number of rotations during dressing, Nd, are computed from the optimal circumferential speed Vsg for grinding the belt p and the optimal circumferential speed Vsd for the dresser proper 31 by $$Ng = Vsg/\pi Ds$$

and $$Nd = Vsd/\pi Ds$$

and these values are set in the inverter unit 23 in advance.

Steps S4 through S7: When the start switch (not illustrated) is turned on, the grinding stone 21 is made to rotate at the number of rotations Ng. On the other hand, the cylinder 15 is extracted to move the roll 14 forward (move it away from the roll 11) to tighten the belt p, and the guide roll 12 is swung down to align it to the belt p, and the roll 14 is rotated.

Step S10: The grinding wheel 20 is shifted from the origin O by a distance La towards the grinding side or the belt p over the roll 11. As a result of this shift by La, the grinding stone 21 comes into contact with the belt p. Its position at this time provides the reference position for the feed of the grinding wheel. During this time, the cover (not illustrated) connected to the dust collecting ducts 48 and 49 (FIG. 1) is closed, and air for cooling, etc. is started to blow out of the pipings 46 and 47.

Steps S12 through S14: This is the stage for grinding the belt p with the grinding wheel 20. First, the grinding stone 21 is fed into the belt p by a distance $\Delta x$ (cutting). This $\Delta x$ is an adequate feed for both the belt p and the grinding stone 21. Generally speaking, one instance of feed is not sufficient to complete the required grinding. Preferably, one feed by the distance $\Delta x$ is made for every turn of the belt p, and this is repeated n times ($n \geq 1$).

Steps S15 and S16: When the grinding is completed, the grinding wheel 20 is restored to the origin O. On the other hand, the air from the pipings 46 and 47 is stopped, and the above-mentioned cover for the dust collection is opened up. The rotation of the roll 14 is stopped, and the guide roll 12 is swung upward and the cylinder 15 is extended to move the roll 14 backward.

Steps S17 and S18: The number of rotations of the grinding wheel 20 is changed to the above-mentioned Nd for dressing, and the grinding wheel 20 is shifted by the distance Lb from the origin O towards the rotary dresser 30. As a result, the grinding stone 21 comes into contact with the dresser proper 31.

Steps S19 through S24: If the specified interval (for instance, grinding of several tens of belts p) has been passed since the latest dressing of the grinding stone 21, the motor 32 is started in order to rotate the dresser 30. Then the grinding wheel 20 is fed by a distance of $\Delta y$ (thus dressing is accomplished). This $\Delta y$ is a feed which is set in advance by estimating the wear of the grinding stone 21 for the above-mentioned interval. When this feed is completed, the grinding wheel 20 is moved backward. The above-mentioned feed $\Delta y$ is just the dimension of the portion cut away from the outer circumference of the grinding stone 21 by dressing. The outer diameter of the grinding stone 21 has been changed to $Ds-2\Delta y$. Hence the original Ds is corrected to this value through the above-mentioned control panel 27. Correcting Ds according to the feed $\Delta y$ in this manner enables setting of proper shifts La and Lb in the step S2 of processing of the next belt p. Thus the reference position of feed for the step S12 is adjusted by the shift of the grinding wheel 20 in the step S10. On the other hand, rotation of the dresser 30 is terminated.

Steps S25 through S30: After completion of the above-mentioned steps S19 through S24, or if the specified interval has not been passed, immediately after the step S19, water is jetted from the feed water piping 43 against the grinding stone 21 to cool and wash the grinding stone 21. After a passage of a specified time, water is stopped, and air for drying water is blown from the piping 45. Then the grinding wheel 20 is restored to the origin O and its rotation is terminated. If another belt p is to be ground in succession, the ground belt p, which is brought to a halt and slackened in the step S16, is removed and the next unprocessed belt p is placed over the driving mechanism 10 by this time. The use of air blowing during grinding as explained above and the use Of water jetting whenever grinding is made as explained above make it possible to extend the interval between dressings, resulting in a significant improvement in production efficiency.

The application of the belt grinding machine described above is not limited to belts p containing special fibers such as Cornex. The machine is also applicable to ordinary rubber belts containing various fibers such as cotton, viscose rayon, nylon, polyester, acrylonitrile, vinylon, aromatic nylon (aramid). Grinding stones other than that of silicon carbide may be used provided they are homogeneous. Moreover, as described in the column of action, an arrangement is possible wherein the grinding wheel is not shifted but the belt driving mechanism and the rotary dresser are alternately moved towards or away from the grinding wheel.

As will be clear from the explanation above, the invention has the following advantages or effects:

In the belt grinding machine according to the present invention, the grinding wheel can be used for a long period while high quality and high efficiency of processing are maintained, even when rubber belts to be ground contain special fibers. Thus the production cost of belts can be reduced.

The belt grinding machine automatically and properly sets the reference position for feed between the belt and the grinding wheel. Thus the work burden of the operator is light, and as a result, processing of high precision can be done quickly.

The machine is capable of grinding belts with high precision. Moreover, the circulation of the belt for that purpose is done smoothly and powerfully.

The machine prevents the belt from meandering (shifting in its direction of width). The processing precision is high, and it is not hard to place a belt over the belt driving mechanism.

The machine also has merits in the service life of the grinding wheel and the grinding efficiency.

The machine is free from trouble due to heat generation during grinding. As a result, the precision and efficiency of processing are improved. It is also free from loss of power during processing.

What is claimed is:

1. A belt grinding machine for grinding a belt with a grinding wheel to form an unevenness extending in the longitudinal-direction in the belt, said machine comprising a multiple shaft belt driving mechanism including rolls for holding a belt over them and for rotating said belt, an abrasive grinding wheel including a rotary driving means and a dresser for forming said unevenness in said abrasive grinding wheel and for dressing the surface of said abrasive grinding wheel, and reciprocating drive means for producing a first relative feed between said belt driving mechanism and said grinding wheel and for producing a second relative feed between said grinding wheel and said dresser so as to make a circumferential contact at a first reference point between said belt and said grinding wheel and to make a circumferential contact at a second reference point between said grinding wheel and said dresser, control means connected to said drive means for producing said first relative feed to said first reference point plus a grinding feed distance to grind said belt, for producing said second relative feed to said second reference point plus a dressing feed distance to dress said grinding wheel, for producing an adjusted first reference point based on said first reference point and said dressing feed distance, and for producing said first relative feed to said adjusted first reference point plus said grinding feed distance to grind at least one subsequent belt.

2. A belt grinding machine for grinding a belt with a grinding wheel to form an unevenness extending in the longitudinal direction in the belt, said machine comprising a multiple shaft belt driving mechanism including rolls for holding a belt over them, an abrasive grinding wheel including a rotary driving means and a dresser for dressing the surface of said abrasive wheel, and reciprocating means for producing a relative feed between said belt driving mechanism and said grinding wheel and between said grinding wheel and said dresser so as to make a circumferential contact between said belt and said grinding wheel and between said grinding wheel and said dresser, said belt driving mechanism including a metallic driven roll as one of said rolls that hold a belt over them, and includes, as another of said rolls of the belt driving mechanism, a driving roll which has a circumferential surface formed of rubber or urethane.

3. A belt grinding machine for grinding a belt with a grinding wheel to form an unevenness extending in the longitudinal direction in the belt, said machine comprising a multiple shaft belt driving mechanism including rolls for holding a belt over them, an abrasive grinding wheel including a rotary driving means and a dresser for dressing the surface of said abrasive wheel, and reciprocating means for producing a relative feed between said belt driving mechanism and said grinding wheel and between said grinding wheel and said dresser so as to make a circumferential contact between said belt and said grinding wheel and between said grinding wheel and said dresser, wherein all of said rolls of the belt driving mechanism are mounted in parallel to each other and includes a grinding block roll adjacent said grinding wheel, and a guide roll having flanges on both sides thereof for preventing meandering of the belt is provided near and in parallel to said grinding block roll, said guide roll being movable so that it may contact said belt or be retracted away from said belt.

4. A belt grinding machine of claim 1, which is provided with a liquid jetting means that cools and washes the grinding wheel after grinding.

5. A belt grinding machine for grinding a belt with a grinding wheel to form an unevenness extending in the longitudinal direction in the belt, said machine comprising a multiple shaft belt driving mechanism including rolls for holding a belt over them, an abrasive grinding wheel including a rotary driving means and a dresser for dressing the surface of said abrasive wheel, and reciprocating means for producing a relative feed between said belt driving mechanism and said grinding wheel and between said grinding wheel and said dresser so as to make a circumferential contact between said belt and said grinding wheel and between said grinding wheel and said dresser, wherein one or more of said rolls of said belt driving mechanism, that contact said belt, are internally cooled with water, and an air spraying means is provided for cooling said grinding wheel and preventing clogging during grinding.

6. A belt grinding machine for grinding a belt with a grinding wheel to form an unevenness extending in the longitudinal direction in the belt, said machine comprising a multiple shaft belt driving mechanism including rolls for holding a belt over them, an abrasive grinding wheel including a rotary driving means and a dresser for dressing the surface of said abrasive wheel, and reciprocating means for producing a relative feed between said belt driving mechanism and said grinding wheel and between said grinding wheel and said dresser so as to make a circumferential contact between said belt and said grinding wheel and between said grinding wheel and said dresser, and further comprising means for setting a reference position for the relative feed between said belt and said grinding wheel in accordance with the relative feed between said grinding wheel and said dresser made by said reciprocating means, wherein said belt driving mechanism includes a metallic driven roll as one of said rolls that hold a belt over them, and includes, as another of said rolls of the belt driving mechanism, a driving roll which has a circumferential surface formed of rubber or urethane.

7. A belt grinding machine for grinding a belt with a grinding wheel to form an unevenness extending in the longitudinal direction in the belt, said machine comprising a multiple shaft belt driving mechanism including rolls for holding a belt over them, an abrasive grinding wheel including a rotary driving means and a dresser for dressing the surface of said abrasive wheel, and reciprocating means for producing a relative feed between said belt driving mechanism and said grinding wheel and between said grinding wheel and said dresser so as to make a circumferential contact between said belt and said grinding wheel and between said grinding wheel and said dresser, and further comprising means for setting a reference position for the relative feed between said belt and said grinding wheel in accordance with the relative feed between said grinding wheel and said dresser made by said reciprocating means, wherein all of said rolls of the belt driving mechanism are mounted in parallel to each other and includes a grinding block roll adjacent said grinding wheel, and a guide roll having flanges on both sides thereof for preventing meandering of the belt is provided near and in parallel to said grinding block roll, said guide roll being movable so that it may contact said belt or be retracted away from said belt.

8. A belt grinding machine for grinding a belt with a grinding wheel to form an unevenness extending in the longitudinal direction in the belt, said machine comprising a multiple shaft belt driving mechanism including rolls for holding a belt over them, an abrasive grinding wheel including a rotary driving means and a dresser for dressing the surface of said abrasive wheel, and reciprocating means for producing a relative feed between said belt driving mechanism and said grinding wheel and between said grinding wheel and said dresser so as to make a circumferential contact between said belt and said grinding wheel and between said grinding wheel and said dresser, and further comprising means for setting a reference position for the relative feed between said belt and said grinding wheel in accordance with the relative feed between said grinding wheel and said dresser made by said reciprocating means, wherein one or more of said rolls of said belt driving mechanism, that contact said belt, are internally cooled with water, and an air spraying means is provided for cooling said grinding wheel and preventing clogging during grinding.

9. A belt grinding machine as set forth in claim 1, wherein said control means is connected to said belt driving mechanism and is responsive to said rotation of said belt, said control means being operable to produce said grinding feed distance in a series of increments, and to produce one of said increments after each rotation of said belt.

10. A belt grinding machine as set forth in claim 1, wherein said control means is responsive to the number of belts being ground, and said control means produces said second relative feed plus said dressing feed after grinding a preset number of belts.

11. A belt grinding machine as set forth in claim 1 or claim 10, wherein said unevenness of the belt is formed by alternating ribs and grooves, said grinding wheel being formed of abrasive grains and having a grinding surface profile which is substantially a mirror image of said alternating ribs and grooves, and said dresser has a dressing surface profile which is substantially the same as said alternating ribs and grooves.

* * * * *